United States Patent
Chen et al.

(10) Patent No.: US 10,123,048 B2
(45) Date of Patent: Nov. 6, 2018

(54) METHOD OF FILTER CONTROL FOR BLOCK-BASED ADAPTIVE LOOP FILTERING

(71) Applicant: MediaTek Inc., Hsin-Chu (TW)

(72) Inventors: Ching-Yeh Chen, Taipei (TW); Chia-Yang Tsai, Zhubei (TW); Yu-Wen Huang, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 92 days.

(21) Appl. No.: 15/034,125

(22) PCT Filed: Nov. 13, 2014

(86) PCT No.: PCT/CN2014/090978
§ 371 (c)(1),
(2) Date: May 3, 2016

(87) PCT Pub. No.: WO2015/070772
PCT Pub. Date: May 21, 2015

(65) Prior Publication Data
US 2016/0261863 A1    Sep. 8, 2016

Related U.S. Application Data (60) Provisional application No. 61/948,183, filed on Mar. 5, 2014, provisional application No. 61/904,511, filed on Nov. 15, 2013.

(51) Int. Cl.
*H04N 19/117*    (2014.01)
*H04N 19/82*    (2014.01)
(Continued)

(52) U.S. Cl.
CPC ........... *H04N 19/82* (2014.11); *H04N 19/117* (2014.11); *H04N 19/119* (2014.11); *H04N 19/14* (2014.11);
(Continued)

(58) Field of Classification Search
CPC ........ H04N 19/82; H04N 19/68; H04N 19/18; H04N 19/172; H04N 19/14; H04N 19/117;
(Continued)

(56) References Cited

U.S. PATENT DOCUMENTS

2012/0082244 A1    4/2012    Chen et al.
2013/0003871 A1    1/2013    Bjontegaard et al.
(Continued)

OTHER PUBLICATIONS

Chen, C.Y., et al.; "CE8 Subset2 A Joint Proposal on Improving the Adaptive Loop Filter in TMuC0.9 by MediaTek, Qualcomm, and Toshiba;" Joint Collaborative Team on Video Coding (JCT-VC) of ITU-T SG16 WP3 and ISO/IEC JTC/SC29/WG11; Jan. 2011; pp. 1-18.
(Continued)

*Primary Examiner* — Tung T Vo
*Assistant Examiner* — Joseph W Becker
(74) *Attorney, Agent, or Firm* — Wolf, Greenfield & Sacks, P.C.

(57) ABSTRACT

A method of adaptive loop filtering with implicit sample-based On/Off control for reconstructed video to improve the performance is disclosed. In one embodiment, each pixel of the video data associated with the reconstructed current image unit is classified into a first group and a second group. Adaptive Loop Filter (ALF) is then applied to these pixels belonging to the first group. For pixels in the second group, ALF is not applied. The image unit may correspond to one coding tree block (CTB) or one coding tree unit (CTU). Various classification means for classifying each pixel into a first group or a second group have also been disclosed. The adaptive loop filtering with implicit sample-based On/Off control may also be used as an additional mode in a system supporting block-based On/Off control.

15 Claims, 4 Drawing Sheets

(51) Int. Cl.
*H04N 19/176* (2014.01)
*H04N 19/70* (2014.01)
*H04N 19/119* (2014.01)
*H04N 19/196* (2014.01)
*H04N 19/14* (2014.01)
*H04N 19/172* (2014.01)
*H04N 19/182* (2014.01)
*H04N 19/18* (2014.01)
*H04N 19/68* (2014.01)

(52) U.S. Cl.
CPC ......... *H04N 19/172* (2014.11); *H04N 19/176* (2014.11); *H04N 19/18* (2014.11); *H04N 19/182* (2014.11); *H04N 19/196* (2014.11); *H04N 19/68* (2014.11); *H04N 19/70* (2014.11)

(58) Field of Classification Search
CPC .. H04N 19/182; H04N 19/196; H04N 19/119; H04N 19/70; H04N 19/176
See application file for complete search history.

(56) References Cited

U.S. PATENT DOCUMENTS

| | | |
|---|---|---|
| 2013/0058421 A1 | 3/2013 | Zheng et al. |
| 2013/0142251 A1 | 6/2013 | Maani |
| 2013/0272624 A1 | 10/2013 | Budagavi |
| 2014/0254676 A1* | 9/2014 | Jiang .................... H04N 19/124 375/240.12 |

OTHER PUBLICATIONS

Chen, C.Y., et al.; "CE8 Subtest 3 Adaptation between ALF and AO;" Joint Collaborative Team on Video Coding (JCT-VC) of ITU-T SG16 WP3 and ISO/IEC JTC/SC29/WG11; Mar. 2011; pp. 1-7.

McCann, K., et al.; "High Efficiency Video Coding (HEVC) Test Model 2 (HM 2) Encoder Description;" Joint collaborative Team on Video Coding (JCT-VC) of ITU-T SG16 WP3 and ISO/IEC JTC/SC29/WG11; Oct. 2010; pp. 1-28.

International Search Report dated Feb. 15, 2015, issued in application No. PCT/CN2014/090978.

* cited by examiner

| -1 | -1 | -1 |
|----|----|----|
| -1 | 8  | -1 |
| -1 | -1 | -1 |

Fig. 3A

| 0 | 1 | 0 |
|---|---|---|
| 1 | 4 | 1 |
| 0 | 1 | 0 |

Fig. 3B

| -1 | -2 | -1 |
|----|----|----|
|    |    |    |
| 1  | 2  | 1  |

Fig. 3C

| -1 |   | 1 |
|----|---|---|
| -2 |   | 2 |
| -1 |   | 1 |

Fig. 3D

|   | -1 |   |
|---|----|---|
|   | 2  |   |
|   | -1 |   |

Fig. 3E

|    |    |    |
|----|----|----|
| -1 | 2  | -1 |
|    |    |    |

Fig. 3F

|    | -1 |    |
|----|----|----|
| -1 | 4  | -1 |
|    | -1 |    |

METHOD OF FILTER CONTROL FOR BLOCK-BASED ADAPTIVE LOOP FILTERING

CROSS REFERENCE TO RELATED APPLICATIONS

This Application is a national stage filing under 35 U.S.C. § 371 of International Patent Application Serial No. PCT/CN2014/090978, filed Nov. 13, 2014, entitled "Method of Filter Control for Block-based Adaptive Loop Filtering", which claims the benefit under 35 U.S.C. § 119(e) of U.S. Provisional Patent Application, Ser. No. 61/904,511, filed on Nov. 15, 2013, entitled "Block-based Adaptive Loop Filtering" and U.S. Provisional Patent Application, Ser. No. 61/948,183, filed on Mar. 5, 2014, entitled "Block-based Adaptive Loop Filtering". The U.S. Provisional Patent Applications are hereby incorporated by reference in their entireties.

FIELD OF THE INVENTION

The present invention relates to video coding. In particular, the present invention relates to filter On/Off control for block-based Adaptive Loop Filtering (ALF) for video coding.

BACKGROUND AND RELATED ARTS

High efficiency video coding (HEVC) is a new-generation international video coding standard developed by the Joint Collaborative Team on Video Coding (JCT-VC). The standard is based on the conventional hybrid coding approach. According to HEVC, a picture is divided into multiple non-overlapped Largest Coding Units (LCUs), also called Coding Tree Blocks (CTBs). The pixel values of a Coding Unit (CU) are predicted spatially or temporally. The resulting residual signal is transformed for further redundancy removal. The transform coefficients are then quantized and entropy coded. The reconstructed picture is recovered from the decoded residual signal and the prediction signal. After reconstruction, the reconstructed picture is further processed by in-loop filtering to reduce coding artifacts.

Figure 1:
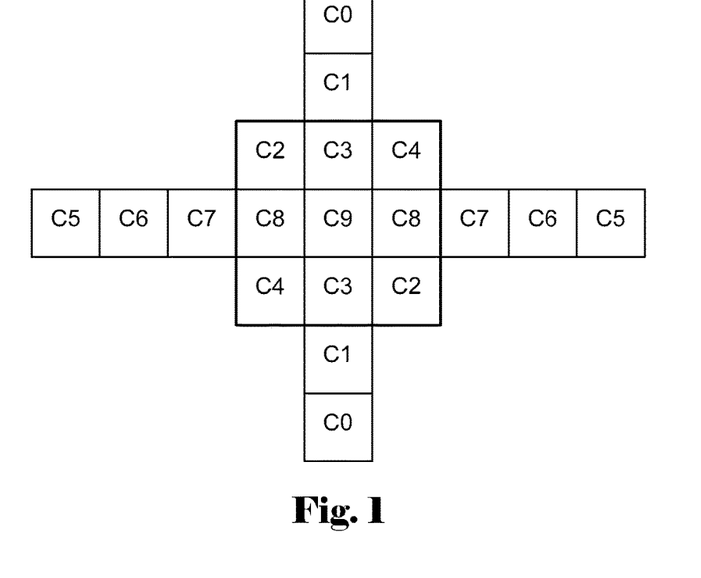
FIG. 1 illustrates the filter shape corresponding to a 9×7 cross with a 3×3 square in the center.

Prior to the adoption of HEVC Test Model 7 (HM-7), an in-loop filtering technique, named Adaptive Loop Filter (ALF), was included in the test model. To optimize the performance, ALF uses Wiener filtering techniques to derive filter coefficients. Furthermore, multiple filters may be used for different picture regions. The coefficients are coded in Adaptation Parameter Set (APS), and On/Off control flags are coded in CTU level syntax elements. The filter shape is 9×7 cross with a 3×3 square in the center as shown in FIG. 1. Due to the symmetry property of this 9×7 filter, only half of the coefficients need to be coded.

Figure 2:
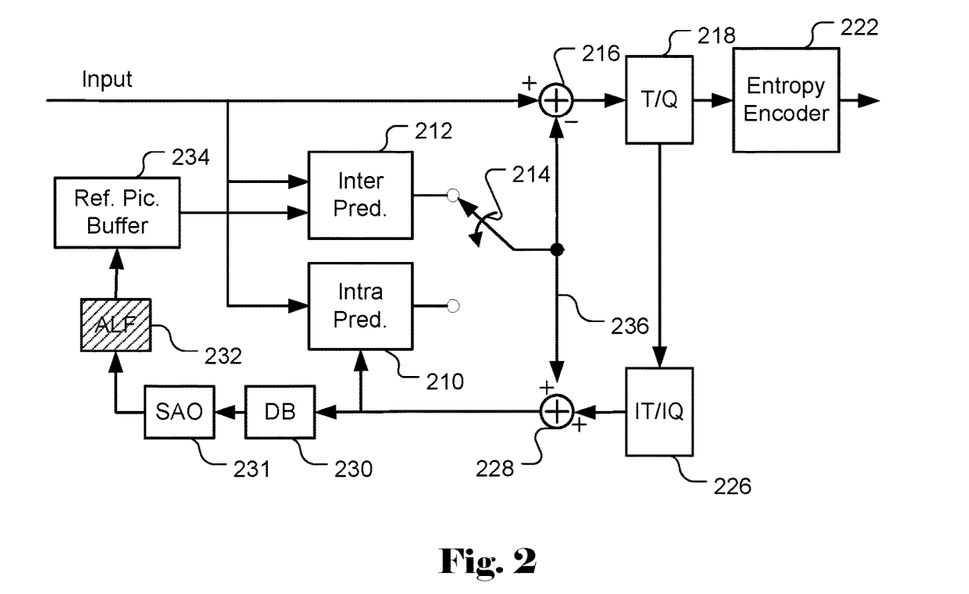
FIG. 2 illustrates an example of an Inter/Intra video coding system incorporating in-loop processing.

FIG. 2 illustrates an exemplary adaptive Inter/Intra video coding system incorporating in-loop processing. The input picture is coded by either Intra Prediction (210) or Inter Prediction (i.e., Motion Estimation/Motion Compensation 212). For inter-prediction, Motion Estimation (ME)/Motion Compensation (MC) 212 is used to provide prediction data based on video data from other picture or pictures. Switch 214 selects Intra Prediction 210 or inter-prediction data and the selected prediction data is supplied to Adder 216 to form prediction error, also called residues. The prediction error is then processed by Transform/Quantization (T/Q) 218. The transformed and quantized residues are then coded by Entropy Encoder 222 to form a video bitstream corresponding to the compressed video data. The bitstream associated with the residues is then packed with side information such as motion, mode, and other information associated with the image area. The side information may also be subject to entropy coding to reduce required bandwidth. In the Intra mode, a reconstructed block may be used to form Intra prediction of spatial neighboring block. Therefore, a reconstructed block from REC 228 may be provided to Intra Prediction 210. When an inter-prediction mode is used, a reference picture or pictures have to be reconstructed at the encoder end as well. Consequently, the transformed and quantized residues are processed by Inverse Quantization/Inverse Transform (IQ/IT) 226 to recover the residues. The residues are then added back to prediction data 236 at Reconstruction (REC) 228 to reconstruct video data. The reconstructed video data can be stored in Reference Picture Buffer 234 and used for prediction of other frames.

As shown in FIG. 2, incoming video data undergoes a series of processing in the encoding system. The reconstructed video data from REC 228 may be subject to various impairments due to a series of processing. Accordingly, various in-loop processing is applied to the reconstructed video data before the reconstructed video data are stored in the Reference Picture Buffer 234 in order to improve video quality. In-loop filtering including deblocking (DF) processing module 230, Sample Adaptive Offset (SAO) processing module 231, and Adaptive Loop Filter (ALF) 232 have been developed to enhance picture quality. The in-loop filter information may have to be incorporated in the bitstream so that a decoder can properly recover the required information. In FIG. 2, ALF 232 is applied after the reconstructed video from REC 228 is processed by DF 230 and SAO 231. Nevertheless, ALF 232 may also be applied to the reconstructed video from REC 228 or ALF 232 is applied after the reconstructed video from REC 228 is processed by DF 230.

BRIEF SUMMARY OF THE INVENTION

A method and apparatus of adaptive loop filtering with implicit sample-based On/Off control for reconstructed video to improve the performance is disclosed. In one embodiment, each pixel of the video data associated with the reconstructed current image unit is classified into a first group and a second group. ALF is then applied to these pixels belonging to the first group. For pixels in the second group, ALF is not applied. The image unit may correspond to one coding tree block (CTB) or one coding tree unit (CTU).

Classification is applied to the video data associated with the reconstructed current image unit on a pixel by pixel basis. Furthermore, the classification utilizes reconstruction video data available to both the encoder side and the decoder side so that the sample-based On/Off control can be achieved implicitly without the need to signal the On/Off control for each pixel. The classification process can be selected from a group consisting of linear filtering, non-linear filtering, edge detection, difference or similarity between the to-be-classified pixel and neighboring pixels, intensity, edge offset (EO) classifications, band offset (BO) classification, magnitude of residual, and any combination thereof. The classification process selected can be signaled in the sequence level, picture level, slice level or block level of the coded bitstream. Side information associated with the classification can be signaled explicitly or determined implicitly.

The adaptive loop filtering with implicit sample-based On/Off control can also be incorporated into a video coding system that utilizes block ALF On/Off control. In this case, an ALF mode may be used to indicate the ALF mode used for the block or blocks in a corresponding sequence, picture, slice or block. The ALF mode is selected from a group consisting of an ALF-On mode, an ALF-Off mode and an ALF Implicit On/Off mode. The adaptive loop filtering with implicit sample-based On/Off control is applied only if the ALF implicit On/Off mode is selected. If the ALF-Off mode is selected, the adaptive loop filter is skipped for all pixels of the video data associated with the reconstructed current image unit. If the ALF-On mode is selected, applying the adaptive loop filter to all samples in the video data associated with the reconstructed current image unit.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In previous methods, On/Off control flags are coded in CTU level to indicate whether ALF is enabled (i.e., ALF-enabled) or disabled (i.e., ALF-disabled) for each CTU. There are three On/Off control flags for three color components, respectively, with one flag for each coding tree block (CTB). When On/Off control flag is enabled (i.e., ALF-enabled being selected), then all of pixels in one CTB are filtered by ALF. If On/Off control flag is disabled (i.e., ALF-disabled being used), all of the pixels are not filtered. However, due to variations within a CTB, not all of the pixels in one CTB can provide coding gains after ALF filtering process. Some pixels may even cause increased distortions after adaptive loop filtering. Therefore, in order to further improve coding efficiency, an implicit pixel-level On/Off control means is disclosed when ALF is enabled. According to the implicit pixel-level On/Off control scheme, the decision regarding whether to apply the adaptive loop filter is made for individual pixels of the block instead of all pixels in the block. Furthermore, the decision is made implicitly based on reconstructed data commonly available to both the encoder side and the decoder side. Therefore, there is no need to signal the On/Off decision for individual pixels.

In one embodiment, when ALF is enabled for a current CTB, a classification means is disclosed that classifies pixels in a CTB into two groups, a filter-On group and a filter-Off group based on reconstructed samples or processed reconstructed samples available at both the encoder and the decoder. Only pixels in the filter-On group will be filtered by ALF, and pixels in the filter-Off group are not filtered. The processed reconstructed samples may correspond to the output data after applying deblocking to the reconstructed samples. The processed reconstructed samples may also correspond to the output data after applying deblocking followed by SAO (Sample Adaptive Offset) to the reconstructed samples. Since the classification is derived based on reconstructed samples available at both the encoder and the decoder, there is no need to transmit information associated with the pixel-based On/Off control. Accordingly, the pixel-based On/Off control is determined implicitly. This implicit pixel On/Off method can be integrated into the case for ALF-enabled. That is, if ALF-enabled is used, then implicit pixel On/Off is always applied.

Alternatively, the implicit pixel On/Off can be added as a new mode (e.g., ALF-implicit On/Off) to the system supporting block based ALF, where the whole block is process by ALF or the whole block is not processed by ALF. The implicit pixel On/Off mode is applied only when ALF-implicit On/Off mode is selected for current CTB. When ALF-enabled mode is used, all of pixels are filtered by ALF. In this case, there are a total of three modes, i.e., ALF-enabled, ALF-implicit On/Off, and ALF-disabled modes for each CTB.

Figure 3A:
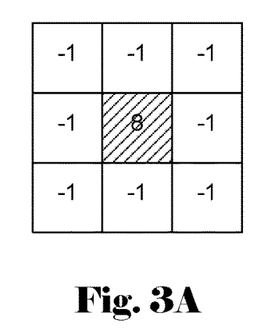
FIG. 3A illustrates an example of high-pass linear filter used for classification.
Figure 3B:
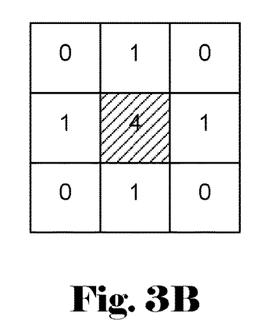
FIG. 3B illustrates an example of low-pass linear filter used for classification.
Figure 3C:
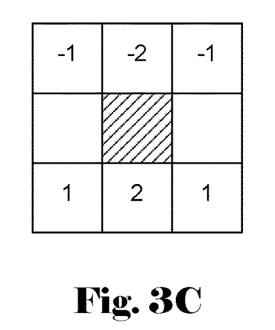
FIG. 3C and FIG. 3D illustrate two examples of Sobel filter used for classification.
Figure 3D:
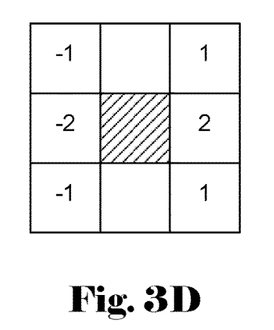
Figure 3E:
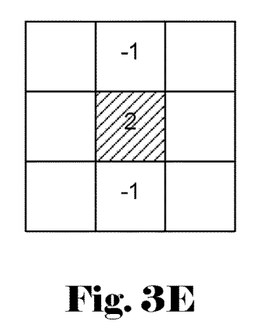
FIGS. 3E-3F illustrate two examples of one-dimensional filter corresponding to similarity between to-be-classified pixel and neighboring pixels by comparing the to-be-classified pixel and two neighboring pixels for classification.
Figure 3F:
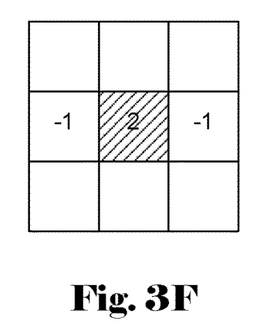
Figure 3G:
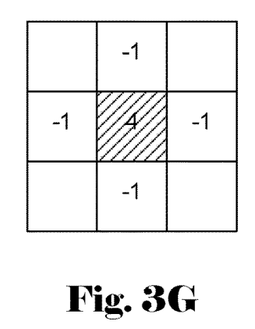
FIG. 3G illustrates an example of two-dimensional filter corresponding to similarity between to-be-classified pixel and neighboring pixels by comparing the to-be-classified pixel and four neighboring pixels for classification.
Figure 4A:
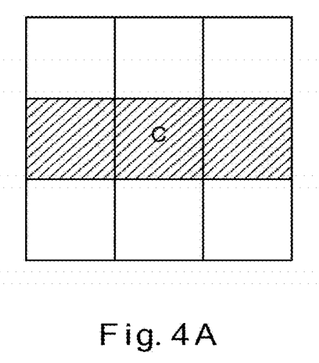
FIGS. 4A-D illustrates edge offset (EO) pixel classification based on a 3×3 window, with four configurations corresponding to 0°, 90°, 135°, and 45° respectively.
Figure 4B:
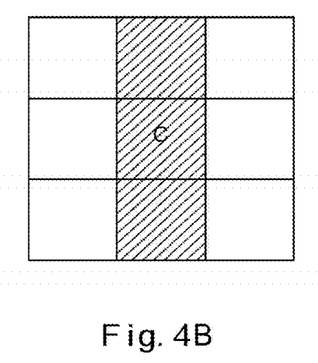
Figure 4C:
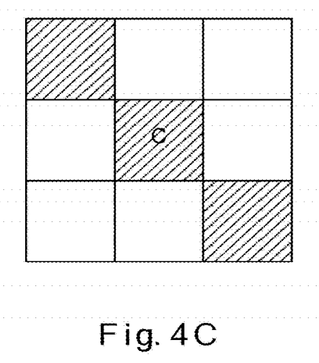
Figure 4D:
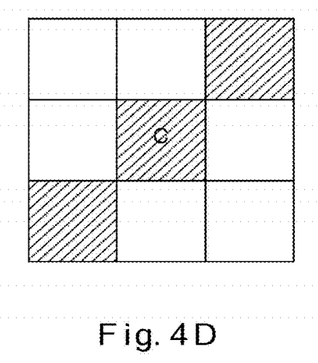

In another embodiment, an implicit pixel On/Off classification is integrated into ALF process. The classification method can be any of the following methods, including linear filter, edge detection, difference or similarity between to-be-classified pixel and neighboring pixels, intensity, the classifications in SAO, the magnitude of residual, and so on. Any combination of the classification methods may also be used. Some exemplary filters are shown as follows. A high-pass linear filter as shown in FIG. 3A or a low-pass linear filter as shown in FIG. 3B can be used. FIG. 3C and FIG. 3D show two examples of Sobel filter. FIGS. 3E-3G show three examples of similarity between to-be-classified pixel and neighboring pixels. FIG. 3E and FIG. 3F correspond to one-dimensional filters comparing the to-be-classified pixel (i.e., the pixel in the center) and two neighboring pixels. FIG. 3G corresponds to a two-dimensional filter comparing the to-be-classified pixel (i.e., the pixel in the center) and four neighboring pixels.

FIGS. 4A-D illustrates edge offset (EO) pixel classification based on a 3×3 window, with four configurations corresponding to 0°, 90°, 135°, and 45° respectively. The classifications used for SAO (Sample Adaptive Offset) include four kinds of Edge Offset (EO) in the High Efficient Video Coding (HEVC) standard. The EO-based classification for SAO can also be used for pixel classification for the present invention. The pixel values at the three locations as highlighted in three lined boxed are compared to determine whether the underlying pixel is to be ALF processed. The Band Offset (BO) used for SAO classification may also be used for pixel classification for the present invention. In another embodiment of the present invention, the intensity is used for pixel classification. For example, only pixels with intensities in one pre-defined intensity interval will be filtered. If there is any additional side information required for the classification, the side information can be signaled explicitly at the sequence level, picture level, slice level or block level, or be pre-defined implicitly according to the classification method. For example, the side information may correspond to a threshold used to compare the high-pass filter output for classification. Moreover, classification methods can be applied adaptively at the sequence level, picture level, slice level or block level. In this case, one or more indices are needed at the corresponding level or levels to indicate which kind of classification methods should be used in ALF process.

Figure 5:
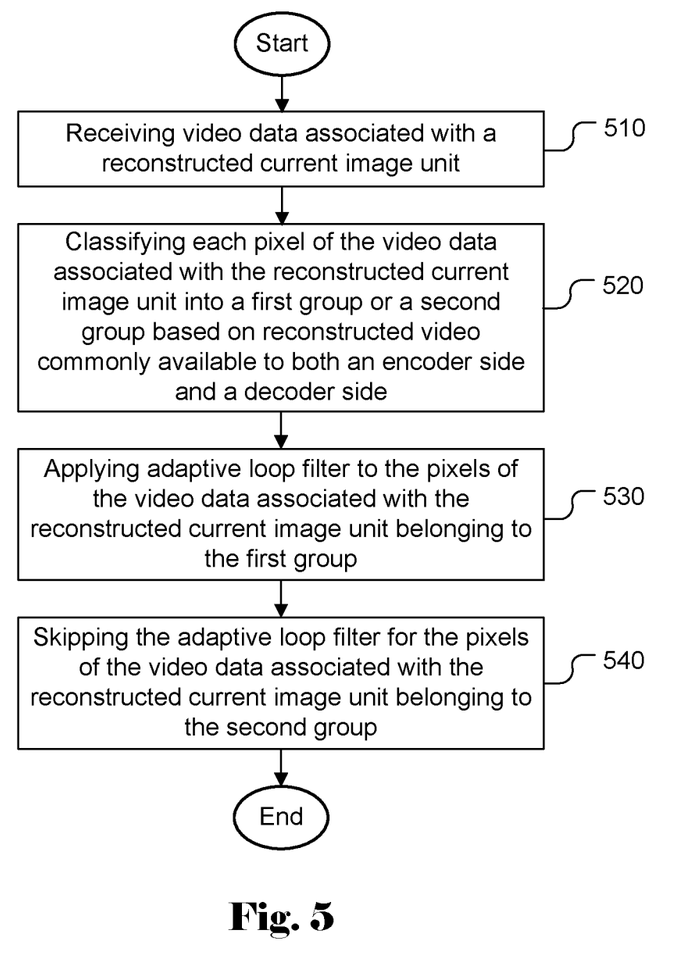
FIG. 5 illustrates an exemplary flowchart of video coding system incorporating adaptive loop filtering with implicit sample-based On/Off control for reconstructed video to improve the performance according to an embodiment of the present invention.

FIG. 5 illustrates an exemplary flowchart of video coding system incorporating adaptive loop filtering with implicit sample-based On/Off control for reconstructed video to improve the performance according to an embodiment of the present invention. The system receives video data associated with a reconstructed current image unit as shown in step 510. The video data may be retrieved from storage such as a computer memory, buffer (RAM or DRAM) or other media. The input data may also be received from a processor such as a controller, a central processing unit, a digital signal processor or electronic circuits that produce the input data. Each pixel of the video data associated with the reconstructed current image unit is classified into a first group or a second group based on reconstructed video commonly available to both an encoder side and a decoder side as shown in step 520. The adaptive loop filter is applied to the pixels of the video data associated with the reconstructed current image unit belonging to the first group as shown in step 530. The adaptive loop filter is skipped for the pixels of the video data associated with the reconstructed current image unit belonging to the second group as shown in step 540.

The flowchart shown above is intended to illustrate examples of adaptive loop filtering method according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of adaptive loop filtering for reconstructed video in a video encoding system or video decoding system, wherein each picture of the reconstructed video is partitioned into image units, the method comprising:
   receiving video data associated with a reconstructed current image unit; and
   applying Implicit Sample-based On/Off adaptive loop filter (ALF) to the video data, wherein said applying Implicit Sample-based On/Off ALF comprises:
      classifying each pixel of the video data associated with the reconstructed current image unit into a first group or a second group based on reconstructed video commonly available to both an encoder side and a decoder side;
      applying adaptive loop filter to the pixels of the video data associated with the reconstructed current image unit belonging to the first group; and skipping the adaptive loop filter for the pixels of the video data associated with the reconstructed current image unit belonging to the second group; and for the video encoding system, selecting an ALF mode for the reconstructed current image unit from a filter mode group consisting of ALF-Off mode, ALF-On mode, and ALF Implicit On/Off mode, wherein said applying Implicit Sample-based On/Off ALF is performed only if the ALF Implicit On/Off mode is selected;

if the ALF-Off mode is selected, skipping the adaptive loop filter for all pixels of the video data associated with the reconstructed current image unit;

if the ALF-On mode is selected, applying the adaptive loop filter to all samples in the video data associated with the reconstructed current image unit; and incorporating one or more syntax elements in a coded bitstream to signal the ALF mode selected for the reconstructed current image unit.

2. The method of claim 1, wherein the image unit corresponds to one coding tree block (CTB) or one coding tree unit (CTU).

3. The method of claim 1, wherein said classifying each pixel of the video data associated with the reconstructed current image unit applies a classification process to the video data associated with the reconstructed current image unit, wherein the classification process is selected from a filter group consisting of linear filtering, non-linear filtering, edge detection, difference or similarity between to-be-classified pixel and neighboring pixels, intensity, edge offset (EO) classifications, band offset (BO) classification, magnitude of residual, and any combination thereof.

4. The method of claim 1, wherein said classifying each pixel of the video data associated with the reconstructed current image unit applies a classification process to the video data associated with the reconstructed current image unit, wherein the classification process is selected from a filter group adaptively at a sequence level, picture level, slice level or block level of a bitstream.

5. The method of claim 4, wherein the block level corresponds to a coding tree block (CTB) level or a coding tree unit (CTU) level.

6. The method of claim 1, wherein the video data associated with the reconstructed current image unit corresponds to the reconstructed current image unit, a first output data resulted from applying deblocking process to the reconstructed current image unit, or a second output data resulted from said applying deblocking process and sample adaptive offset (SAO) process to the reconstructed current image unit.

7. The method of claim 1, further comprising incorporating side information associated with said classifying each pixel of the video data associated with the reconstructed current image unit in at a sequence level, picture level, slice level or block level of a bitstream.

8. The method of claim 1, wherein side information associated with said classifying each pixel of the video data associated with the reconstructed current image unit is determined implicitly.

9. The method of claim 1, wherein said one or more syntax elements is incorporated in a sequence level, picture level, slice level or block level of the coded bitstream to signal the ALF mode.

10. The method of claim 1, for the video decoding system, further comprising:

parsing the ALF mode for the reconstructed current image unit from the coded bitstream, wherein the ALF mode belongs to the filter mode group and said applying Implicit Sample-based On/Off ALF is performed only if the ALF Implicit On/Off mode is selected;

if the ALF-Off mode is selected, skipping the adaptive loop filter for all pixels of the video data associated with the reconstructed current image unit; and if the ALF-On mode is selected, applying the adaptive loop filter to all samples in the video data associated with the reconstructed current image unit.

11. The method of claim 10, wherein the ALF mode is parsed from a sequence level, picture level, slice level or block level of the coded bitstream.

12. An apparatus for applying adaptive loop filtering for reconstructed video in a video encoding system or video decoding system, wherein each picture of the reconstructed video is partitioned into image units, the apparatus comprising one or more electronic circuits configured to:

receive video data associated with a reconstructed current image unit from storage or from a processor; and apply Implicit Sample-based On/Off adaptive loop filter (ALF) to the video data, wherein said apply Implicit Sample-based On/Off ALF comprises:

classifying each pixel of the video data associated with the reconstructed current image unit into a first group or a second group based on reconstructed video commonly available to both an encoder side and a decoder side;

applying adaptive loop filter to the pixels of the video data associated with the reconstructed current image unit belonging to the first group; and skipping the adaptive loop filter for the pixels of the video data associated with the reconstructed current image unit belonging to the second group; and for the video encoding system, select an ALF mode for the reconstructed current image unit from a filter mode group consisting of ALF-Off mode, ALF-On mode, and ALF Implicit On/Off mode, wherein said apply Implicit Sample-based On/Off ALF is performed only if the ALF Implicit On/Off mode is selected;

if the ALF-Off mode is selected, skip the adaptive loop filter for all pixels of the video data associated with the reconstructed current image unit;

if the ALF-On mode is selected, apply the adaptive loop filter to all samples in the video data associated with the reconstructed current image unit; and incorporate one or more syntax elements in a coded bitstream to signal the ALF mode selected for the reconstructed current image unit.

13. The apparatus of claim 12, wherein said classifying each pixel of the video data associated with the reconstructed current image unit applies a classification process to the video data associated with the reconstructed current image unit, wherein the classification process is selected from a filter group consisting of linear filtering, non-linear filtering, edge detection, difference or similarity between to-be-classified pixel and neighboring pixels, intensity, edge offset (EO) classifications, band offset (BO) classification, magnitude of residual, and any combination thereof.

14. The apparatus of claim 12, for the video decoding system, the one or more electronic circuits being further configured to:

parse the ALF mode for the reconstructed current image unit from the coded bitstream, wherein the ALF mode belongs to the filter mode group and said apply Implicit Sample-based On/Off ALF is performed only if the ALF Implicit On/Off mode is selected;

if the ALF-Off mode is selected, skip the adaptive loop filter for all pixels of the video data associated with the reconstructed current image unit; and if the ALF-On mode is selected, apply the adaptive loop filter to all samples in the video data associated with the reconstructed current image unit.

15. A method of adaptive loop filtering for reconstructed video in a video encoding system or video decoding system, wherein each picture of the reconstructed video is partitioned into image units, the method comprising:

receiving video data associated with a reconstructed current image unit; and applying Implicit Sample-based On/Off adaptive loop filter (ALF) to the video data, wherein said applying Implicit Sample-based On/Off ALF comprises:

classifying each pixel of the video data associated with the reconstructed current image unit into a first group or a second group based on reconstructed video commonly available to both an encoder side and a decoder side;

applying adaptive loop filter to the pixels of the video data associated with the reconstructed current image unit belonging to the first group; and skipping the adaptive loop filter for the pixels of the video data associated with the reconstructed current image unit belonging to the second group; and for the video decoding system, parsing an ALF mode for the reconstructed current image unit from a coded bitstream, wherein the ALF mode belongs to a filter mode group consisting of ALF-Off mode, ALF-On mode, and ALF Implicit On/Off mode and said applying Implicit Sample-based On/Off ALF is performed only if the ALF Implicit On/Off mode is selected;

if the ALF-Off mode is selected, skipping the adaptive loop filter for all pixels of the video data associated with the reconstructed current image unit; and if the ALF-On mode is selected, applying the adaptive loop filter to all samples in the video data associated with the reconstructed current image unit.

* * * * *